(12) United States Patent
Robbins et al.

(10) Patent No.: US 7,549,081 B2
(45) Date of Patent: Jun. 16, 2009

(54) PROCESSOR ARRAY

(75) Inventors: William Robbins, Bristol (GB);
Michael Davison, Gloucestershire (GB);
Simon Howell, Bristol (GB); Anthony Peter John Claydon, Bath (GB)

(73) Assignee: picoChips Design Limited, Bath (GB)

( * ) Notice: Subject to any disclaimer, the term of this patent is extended or adjusted under 35 U.S.C. 154(b) by 595 days.

(21) Appl. No.: 10/521,889

(22) PCT Filed: Jun. 27, 2003

(86) PCT No.: PCT/GB03/02772

§ 371 (c)(1),
(2), (4) Date: May 25, 2005

(87) PCT Pub. No.: WO2004/010321

PCT Pub. Date: Jan. 29, 2004

(65) Prior Publication Data

US 2005/0257105 A1 Nov. 17, 2005

(30) Foreign Application Priority Data

Jul. 19, 2002 (GB) ................................. 0216880.5

(51) Int. Cl.
*G06F 11/00* (2006.01)
(52) U.S. Cl. ......................................................... 714/10
(58) Field of Classification Search ................... 714/10
See application file for complete search history.

(56) References Cited

U.S. PATENT DOCUMENTS

| 4,601,031 A | 7/1986 | Walker et al. |
| 4,603,404 A | 7/1986 | Yamauchi et al. |
| 4,858,233 A | 8/1989 | Dyson et al. |
| 5,065,308 A * | 11/1991 | Evans .......................... 714/11 |
| 5,253,308 A | 10/1993 | Johnson |
| 5,795,797 A | 8/1998 | Chester et al. |
| 5,796,937 A | 8/1998 | Kizuka |
| 6,408,402 B1 * | 6/2002 | Norman ........................ 714/10 |
| 6,681,341 B1 * | 1/2004 | Fredenburg et al. ........... 714/30 |
| 2002/0174318 A1 | 11/2002 | Stuttard et al. |

FOREIGN PATENT DOCUMENTS

EP  0 180 212 A2  5/1986

(Continued)

OTHER PUBLICATIONS

Popli, S. P., et al., "A Reconfigurable VLSI Array for Reliability and Yield Enhancement," Proceedings of the International Conference on Systolic Arrays, 1988, pp. 631-642.

(Continued)

*Primary Examiner*—Michael C Maskulinski
(74) *Attorney, Agent, or Firm*—Potomac Patent Group PLLC

(57) ABSTRACT

An array of processing elements can incorporate a degree of redundancy. Specifically, the array includes one or more spare, or redundant, rows of array elements, in addition to the number required to implement the intended function or functions of the device. If a defect occurs in one of the processors in the device, then the entire row which includes that defective processor is not used, and is replaced by a spare row.

8 Claims, 15 Drawing Sheets

FOREIGN PATENT DOCUMENTS

| WO | WO 91/11770 | 8/1991 |
| WO | WO 01/02960 A1 | 1/2001 |
| WO | WO 02/50624 A2 | 6/2002 |

OTHER PUBLICATIONS

John, L. K., et al., "A Dynamically Reconfigurable Interconnect for Array Processors," IEEE Transactions on Very Large Scale Integration (VLSI) Systems, vol. 6, No. 1, Mar. 1998, pp. 150-157.

Shigei, N., et al., "On Efficient Spare Arrangements and an Algorithm with Relocating Spares for Reconfiguring Processor Arrays," IEICE Transactions on Fundamentals of Electronics, Communications and Computer Sciences, vol. E80-A, No. 6, Jun. 1997, pp. 988-995.

Schmidt, U., et al., "Datawave: A Single-Chip Multiprocessor for Video Applications," IEEE Micro, vol. 11, No. 3, Jun. 1991, pp. 22-25, 88-94.

Chean, M., et al., "A Taxonomy of Reconfiguration Techniques for Fault-Tolerant Processor Arrays," Computer, IEEE Computer Society, vol. 23, No. 1, Jan. 1990, pp. 55-69.

Kamiura, N., et al., "A Repairable and Diagnosable Cellular Array on Multiple-Valued Logic," Proceedings of the 23rd International Symposium on Multiple-Valued Logic, 1993, pp. 92-97.

LaForge, L., "Extremally Fault Tolerant Arrays," Proceedings: International Conference on Wafer Scale Integration, 1989, pp. 365-378.

International Search Report of PCT/GB03/02772, dated Nov. 30, 2004.

Great Britain Search Report of Application No. GB 0216880.5, dated Jan. 28, 2003.

Great Britain Search Report of Application No. GB 0216880.5, dated Oct. 9, 2003.

Great Britain Search Report of Application No. GB 0216880.5, dated Apr. 1, 2005.

* cited by examiner

PROCESSOR ARRAY

This invention relates to a processor array, and in particular to a processor array with a degree of redundancy which allows the array to operate normally, even in the presence of one or more defective processor.

GB-A-2370380 discloses a processor array, in which data processing functions are distributed amongst processors in an array, the processors being linked by buses and switch elements which determine how data is transferred from one array element to another.

Manufacturing processes for semiconductor devices are imperfect. These imperfections result in point defects that are distributed over a silicon wafer. For a given defect density, if the die size is larger, then the proportion of devices with defects will be greater. For most semiconductor devices, if a defect occurs anywhere on the die then that die must be discarded, because all the circuitry in the device is required for correct operation.

One known exception to this is in the case of memory devices, such as Random Access Memories (RAMs). In this case, because the bulk of the device consists of a regular array of memory cells, spare (redundant) columns or cells may be incorporated in the device that can be used to replace columns in which defects are detected during testing. In order to achieve the replacement of defective columns, switches, controlled by means of laser fuses, are incorporated in the circuitry. These fuses are selectively blown as a result of information obtained from the testing. This increases the proportion of usable devices that can be obtained from a wafer.

The present invention provides an array of processing elements, which can incorporate a degree of redundancy. Specifically, the array includes one or more spare, or redundant, rows of array elements, in addition to the number required to implement the intended function or functions of the device. If a defect occurs in one of the processors in the device, then the entire row which includes that defective processor is not used, and is replaced by a spare row.

According to a first aspect of the present invention, there is provided method of replacing a faulty processor element, in a processor array comprising a plurality of processor elements arranged in an array of rows and columns, the processor elements being interconnected by buses running between the rows and columns and by switches located at the intersections of the buses, and the array including a redundant row to which no functionality is initially allocated. In the event that a first processor element is found to be faulty, functionality is removed from the row that contains said first processing element, and allocated instead to the redundant row.

This allows the required functionality to be carried out, even on a device which includes a faulty processor element. This can significantly increase the proportion of usable devices which are obtained from the manufacturing process.

According to a second aspect of the present invention, there is provided a processor array, which has processor elements arranged in an array of rows and columns, wherein the arrangement of processor elements in each row is the same as the arrangements of processor elements in each other row; pairs of horizontal buses running between the rows of processor elements, each pair comprising a first horizontal bus carrying data in a first direction and a second horizontal bus carrying data in a second direction opposite to the first direction; vertical buses running between the columns of processor elements, wherein some pairs of adjacent columns of processor elements have no vertical buses running therebetween, and other pairs of adjacent columns have two buses carrying data in a first direction and two buses carrying data in a second direction opposite to the first direction running therebetween; and switches located at the intersections of the horizontal and vertical buses.

This array, and in particular the uneven arrangement of the vertical buses, allows the most efficient use of the method according to the first aspect of the invention.

For a better understanding of the present invention, and to show how it may be put into effect, reference will now be made, by way of example, to the accompanying drawings, in which:

FIG. 1 shows an array architecture in accordance with the present invention. The array architecture is generally as described in GB-A-2370380 and GB-A-2370381, which are incorporated herein by reference, with modifications which will be described further herein.

Figure 1:
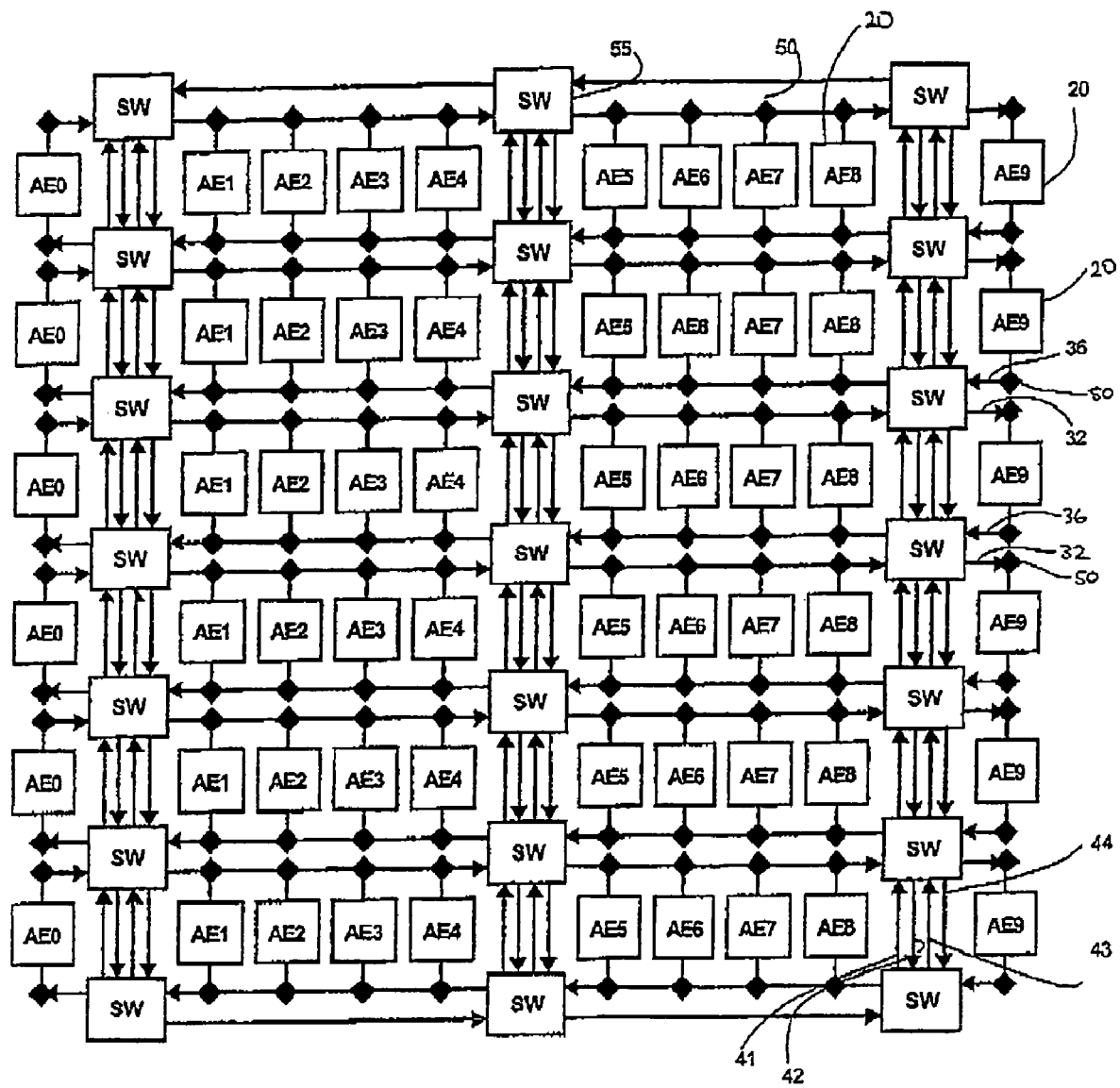
FIG. 1 is a block schematic diagram of an array according to the present invention.

The array consists of a plurality of array elements 20, arranged in a matrix. For ease of illustration, the example shown in FIG. 1 has six rows, each consisting of ten array elements (AE0, AE1, . . . , AE9), giving a total of 60 array elements, but a practical embodiment of the invention may for example have over 400 array elements in total. Each array element, 20, is connected to a segment of a respective first horizontal bus 32 running from left to right, and to a segment of a respective second horizontal bus 36 running from right to left, by means of respective connectors 50. The horizontal bus segments 32, 36 are connected to vertical bus segments 41, 43 running upwards and to vertical bus segments 42, 44 running downwards, at switches 55. Specifically, each switch 55 has an input left-right horizontal bus segment 32, an input right-left horizontal bus segment 36, two input upwards vertical bus segments 41, 43, and two input downwards vertical bus segments 42, 44, plus an output left-right horizontal bus segment 32, an output right-left horizontal bus segment 36, two output upwards vertical bus segments 41, 43, and two output downwards vertical bus segments 42, 44.

All horizontal bus segments 32, 36 and vertical bus segments 41, 43, 42, 44 are 32 bits wide.

Thus, while some pairs of adjacent columns of processor elements (e.g. AE1 and AE2, AE6 and AE7) have no vertical buses running therebetween, other pairs of adjacent columns (e.g. AE4 and AE5, AE8 and AE9) have two buses carrying data in a first direction and two buses carrying data in a second direction opposite to the first direction running therebetween. This unevenly spaced arrangement, providing two pairs of vertical buses after a group of four columns of array elements rather than, say, one pair of vertical buses after a group of two columns of array elements, is more efficient, for reasons which will be described below.

Figure 2:
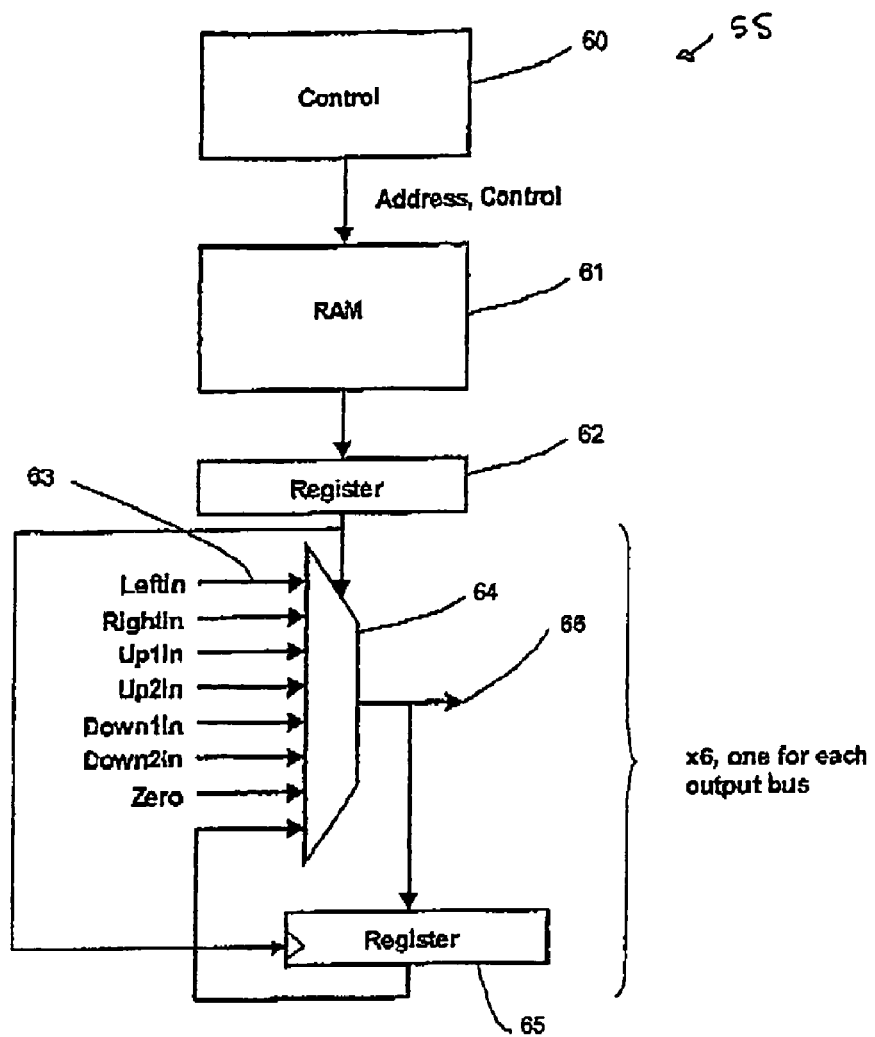
FIG. 2 is a block schematic diagram of a switch within the array of FIG. 1.

FIG. 2 shows the structure of one of the switches 55, each of the switches being the same. The switch includes a random access memory RAM 61, which is pre-loaded with data. The switch 55 is locally controlled by a controller 60, which contains a counter that counts through the addresses of RAM 61 in a predetermined sequence. This same sequence is repeated indefinitely, and the time taken to complete the sequence once, measured in cycles of the system clock, is referred to as the sequence period. On each clock cycle, the output data from RAM 61 is loaded into a register 62, and the content of the register 62 is used to select the source for each output bus 66 using multiplexer 64.

The source for the output bus 66 may be any one of the six input buses, namely the input left-right horizontal bus segment LeftIn, the input right-left horizontal bus segment RightIn, the two input upwards vertical bus segments Up1In and Up2In, or the two input downwards vertical bus segments Down1In and Down2In. in addition, the value zero can be selected as the source for an output bus, as can the value that was on the output bus during a previous clock cycle, which is loaded into a register 65 under the control of one of the bits in register 62.

When an output bus is not being used, it is advantageous to select zero as the source, so that the value on the bus will remain unchanged over several clock cycles, thereby conserving power.

In FIG. 2, only one multiplexer 64 and its associated register 65 is shown, although the switch 55 includes six such multiplexers and associated registers, one for each output bus.

The biggest component of the switch 55 is the RAM 61, although this is still small by the standards of RAMs generally. Therefore, the size of the RAM 61 is dictated to a large extent by the address decoding section of the RAM. Since this is not dependent on the number of buses being switched in the switch 55, the overall size of the device can be reduced by providing two pairs of vertical buses, and one switch in each row, after a group of four columns of array elements, as compared with providing, say, one pair of vertical buses, and one switch in each row, after each group of two columns of array elements.

Figure 3:
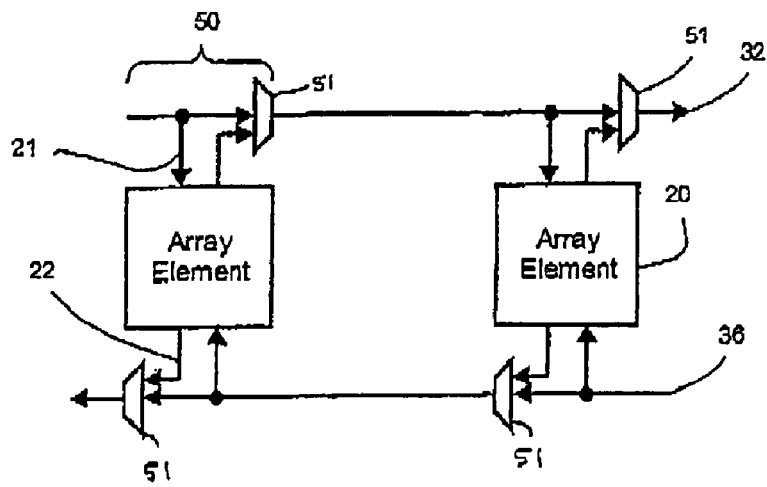
FIG. 3 is an enlarged block schematic diagram of a part of the array of FIG. 1.

FIG. 3 shows in more detail how each array element 20 is connected to the segments of the horizontal buses 32, 36 at a connector 50. Each such connector 50 includes a multiplexer 51, and a segment of the bus is defined as the portion between two such multiplexers 51. Each segment of a left-right horizontal bus 32 is connected to an input of a respective array element 20 by means of a connection 21. An output 22 of each array element 20 is connected to a respective segment of a right-left horizontal bus 36 through another multiplexer 51.

Each multiplexer 51 is under control of circuitry (not shown) within the associated array element 20, which determines whether the multiplexer outputs the data on the input bus segment or the data on the array element output.

All communication within the array takes place in a predetermined sequence, which lasts for a predetermined number (for example, 1024) of clock cycles (the sequence period that is described above). Each switch and each array element contains a counter that counts for the sequence period. As described above, on each cycle of this sequence, each switch selects data from one of the eight possible sources onto each of its six output buses. At predetermined cycles, array elements load data in from the respective input bus segments via the respective connections 21, and switch data onto the respective output bus segments using the multiplexers 51.

Each array element is capable of controlling its associated multiplexer, and loading data from the bus segments to which it is connected at the correct times in sequence, and of performing some useful function on the data. The useful function may consist only of storing the data.

However, in a preferred embodiment of the invention, each array element contains a complex microprocessor, the area of which is several times more than that of each switch. This difference in size makes the present invention, which is concerned with overcoming failures in the array elements rather than in the switches, particularly effective.

If the array elements are not all identical then, in order for the present invention to be usable most efficiently, at least within each column of the array, all of the array elements should be identical.

Figure 4:
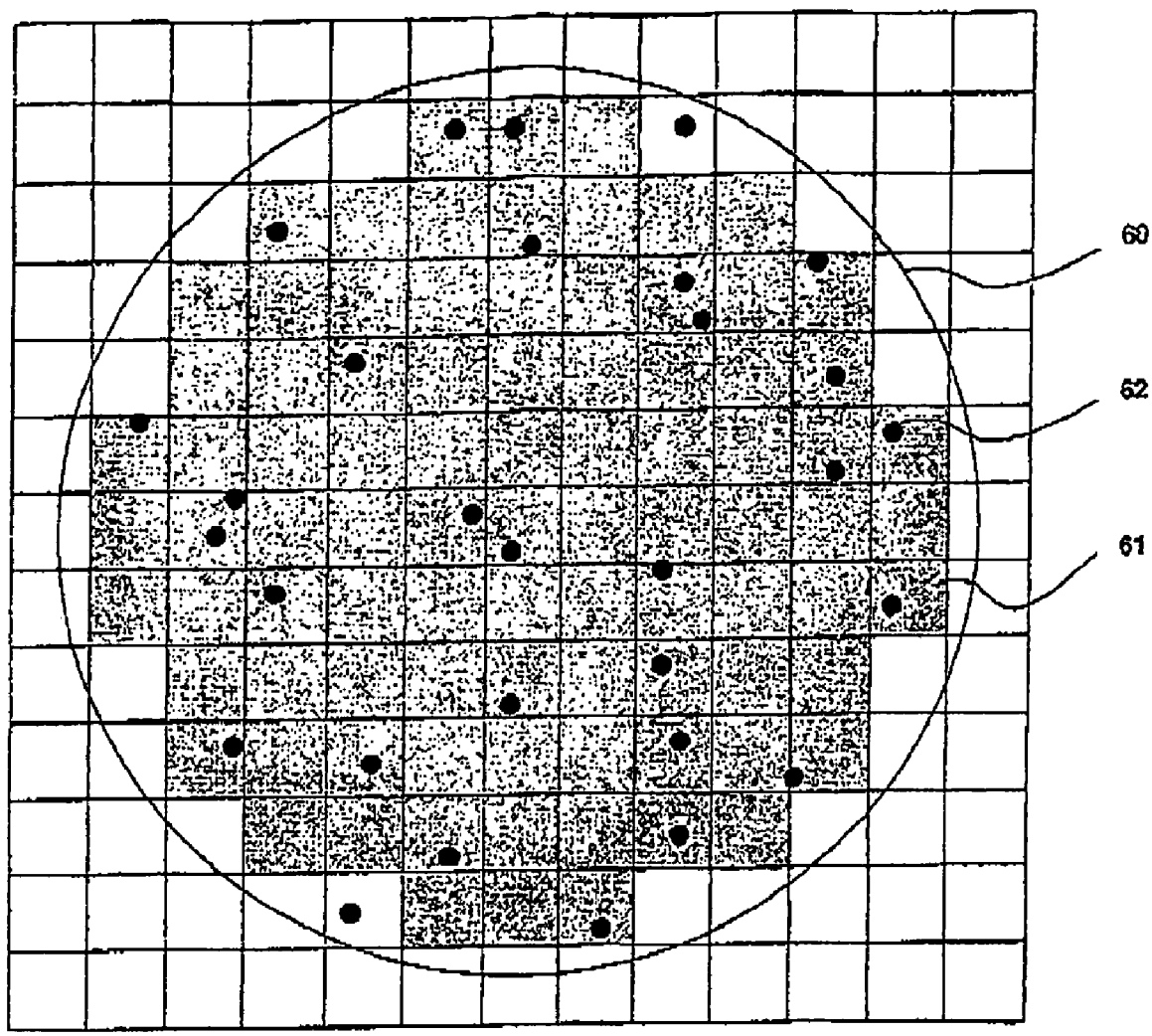
FIG. 4 is a schematic representation of a semiconductor wafer used to manufacture the array of FIG. 1.

The manufacturing processes for semiconductor devices are imperfect. This results in point defects that are distributed over a silicon wafer. For a given manufacturing process at a given state of maturity this defect density will be roughly constant. This is illustrated in FIG. 4, which shows the boundary of a circular silicon wafer 60, the individual square dice 61 which are used for making individual devices, and randomly distributed defects 62.

For a given defect density, if the die size is larger, then the proportion of devices with defects will be greater.

For most semiconductor devices, if a defect occurs anywhere on the die then that die must be discarded, because all the circuitry in the device is required for correct operation.

According to the present invention, the array of processing elements incorporates a degree of redundancy. More specifically, one or more spare (redundant) rows of array elements, over and above the number required to implement the intended function or functions of the device, is included in the array. If a defect occurs in one of the processing elements, either during manufacturing or in operation of the device, then the entire row of array elements which includes the defective processing element is not used, and is replaced by a spare row.

Since the array elements within a column are all identical, as mentioned above, each row of array elements is identical, and all of the functionality of the row that includes the defective processing element can be performed by the spare row.

Figure 5:
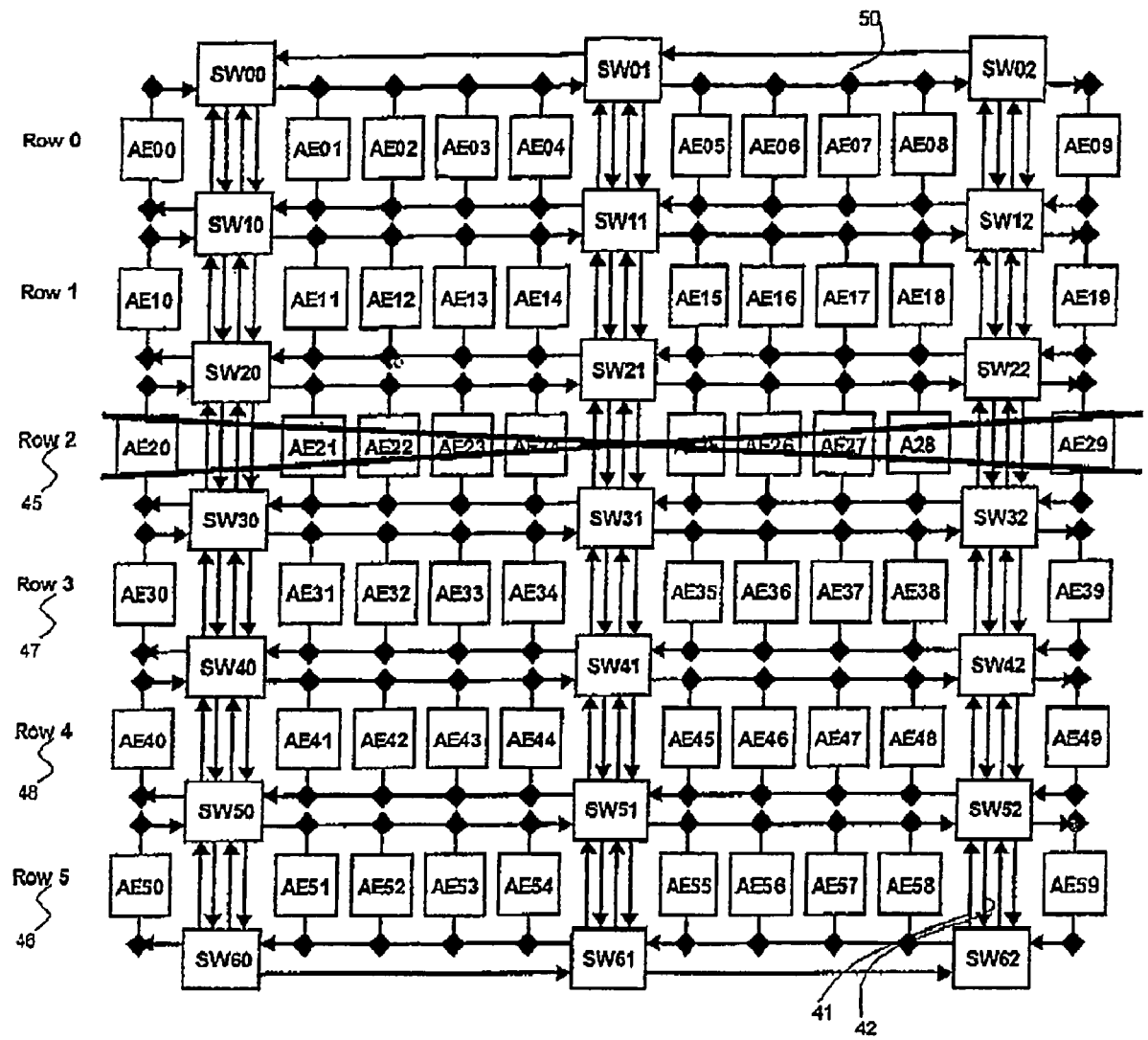
FIG. 5 is a block schematic diagram or the array of FIG. 1, showing the effect of a possible defect.

FIG. 5 shows an array of processing elements as shown in FIG. 1, with the six rows indicated as Row n (n=0, . . . , 5), and the ten array elements in each row indicated as AEnm (m=0, . . . , 9). If a defect is detected in any of the array elements in row 2, for example, then that entire row of array elements is not used. In more detail, if it was originally intended that the spare row should be Row 5, and the production test process detects a fault in an array element in Row 2, then the software programs that would otherwise have been loaded into the array elements of Row 2 are loaded into the corresponding array elements of Row 3; the software programs that would otherwise have been loaded into the array elements of Row 3 are loaded into the corresponding array elements of Row 4; and the software programs that would otherwise have been loaded into the array elements of Row 4 are loaded into the corresponding array elements of Row 5.

Denoting the software program that was originally destined for any one of the array elements AEnm as Prognm, the complete redistribution of programs is defined below:

| Array Element | Original Program | Revised Program | Array Element | Original Program | Revised Program | Array Element | Original Program | Revised Program |
|---|---|---|---|---|---|---|---|---|
| AE00 | Prog00 | Prog00 | AE01 | Prog01 | Prog01 | AE02 | Prog02 | Prog02 |
| AE03 | Prog03 | Prog03 | AE04 | Prog04 | Prog04 | AE05 | Prog05 | Prog05 |
| AE06 | Prog06 | Prog06 | AE07 | Prog07 | Prog07 | AE08 | Prog08 | Prog08 |
| AE09 | Prog09 | Prog09 | AE10 | Prog10 | Prog10 | AE11 | Prog11 | Prog11 |
| AE12 | Prog12 | Prog12 | AE13 | Prog13 | Prog13 | AE14 | Prog14 | Prog14 |
| AE15 | Prog15 | Prog15 | AE16 | Prog16 | Prog16 | AE17 | Prog17 | Prog17 |
| AE18 | Prog18 | Prog18 | AE19 | Prog19 | Prog19 | AE20 | Prog20 | Unused |
| AE21 | Prog21 | Unused | AE22 | Prog22 | Unused | AE23 | Prog23 | Unused |
| AE24 | Prog24 | Unused | AE25 | Prog25 | Unused | AE26 | Prog26 | Unused |
| AE27 | Prog27 | Unused | AE28 | Prog28 | Unused | AE29 | Prog29 | Unused |
| AE30 | Prog30 | Prog20 | AE31 | Prog31 | Prog21 | AE32 | Prog32 | Prog22 |
| AE33 | Prog33 | Prog23 | AE34 | Prog34 | Prog24 | AE35 | Prog35 | Prog25 |
| AE36 | Prog36 | Prog26 | AE37 | Prog37 | Prog27 | AE38 | Prog38 | Prog28 |
| AE39 | Prog39 | Prog29 | AE40 | Prog40 | Prog30 | AE41 | Prog41 | Prog31 |
| AE42 | Prog42 | Prog32 | AE43 | Prog43 | Prog33 | AE44 | Prog44 | Prog34 |
| AE45 | Prog45 | Prog35 | AE46 | Prog46 | Prog36 | AE47 | Prog47 | Prog37 |
| AE48 | Prog48 | Prog38 | AE49 | Prog49 | Prog39 | AE50 | Unused | Prog40 |
| AE51 | Unused | Prog41 | AE52 | Unused | Prog42 | AE53 | Unused | Prog43 |
| AE54 | Unused | Prog44 | AE55 | Unused | Prog45 | AE56 | Unused | Prog46 |
| AE57 | Unused | Prog47 | AE58 | Unused | Prog48 | AE59 | Unused | Prog49 |

Figure 6:
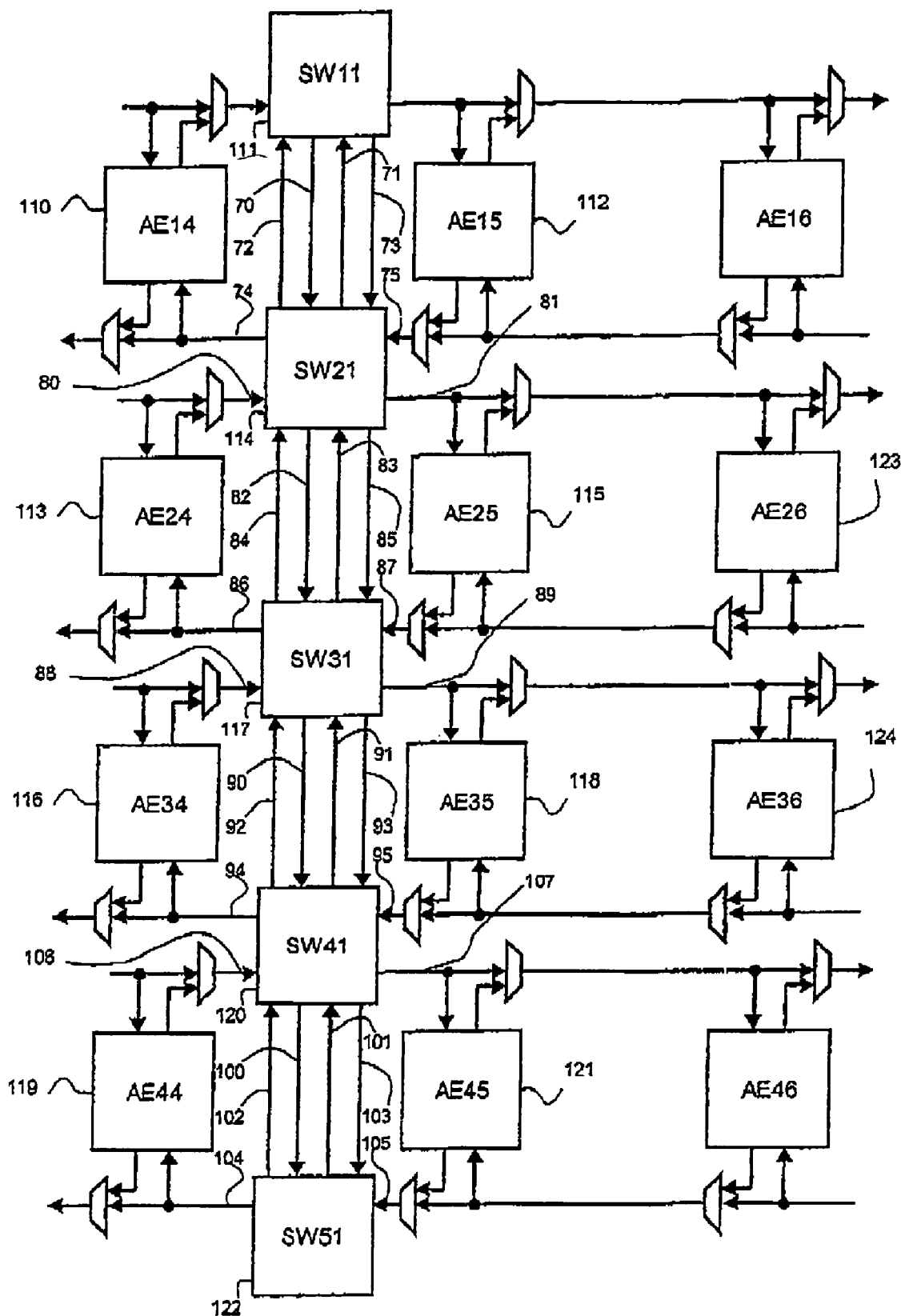
FIGS. 6-16 are enlarged block schematic diagrams of a part of the array of FIG. 1, showing the operation of the device in the event of possible defects.

In addition to redistributing the programs that run on the array elements, the contents of the RAMs in the switches must also be changed, so that the data is transferred to the array element which will now be using it. As can be seen from the table above, the programs are redistributed in such a way that programs which are run on array elements above the row with the defective array element are run on the same array element, while programs which are run on array elements in or below the row with the defective array element are run on the corresponding array element in the row below their original row. In the same way, therefore, the RAMs are reprogrammed so that the routes taken by data move down with the failed row and the rows below it, and stay in the same places in the row above the failed row. When the routes begin or end on the failed row or pass through the failed row, the situation is slightly more complex. All cases will be described with the aid of FIG. 6, which shows a detailed view of part of the array of FIG. 5, and also FIGS. 7 to 16, which show specific examples of the requirements for switch reprogramming.

As illustrated in FIG. 5, it is assumed that one of the array elements in Row 2 has failed, and hence that all of the array elements in that row are no longer to be used. Specifically, referring to FIG. 6, the programs that would have run on AE24, AE25 and AE26, are transferred to AE34, AE35, and AE36, respectively. Similarly, the programs that would have run on AE34, AE35 and AE36, are transferred to AE44, AE45, and AE46, and so on. In FIGS. 7 to 16, bold dotted lines indicate resources (connectors, switches or multiplexers) that are used in the original (fault-free) configuration, double lines indicate resources that are used in the new configuration and bold solid lines indicate resources that are used in both the original and new configurations.

Data is rerouted according to the rules set out below.

For a horizontal route above the railed row then there is no change.

Figure 7:
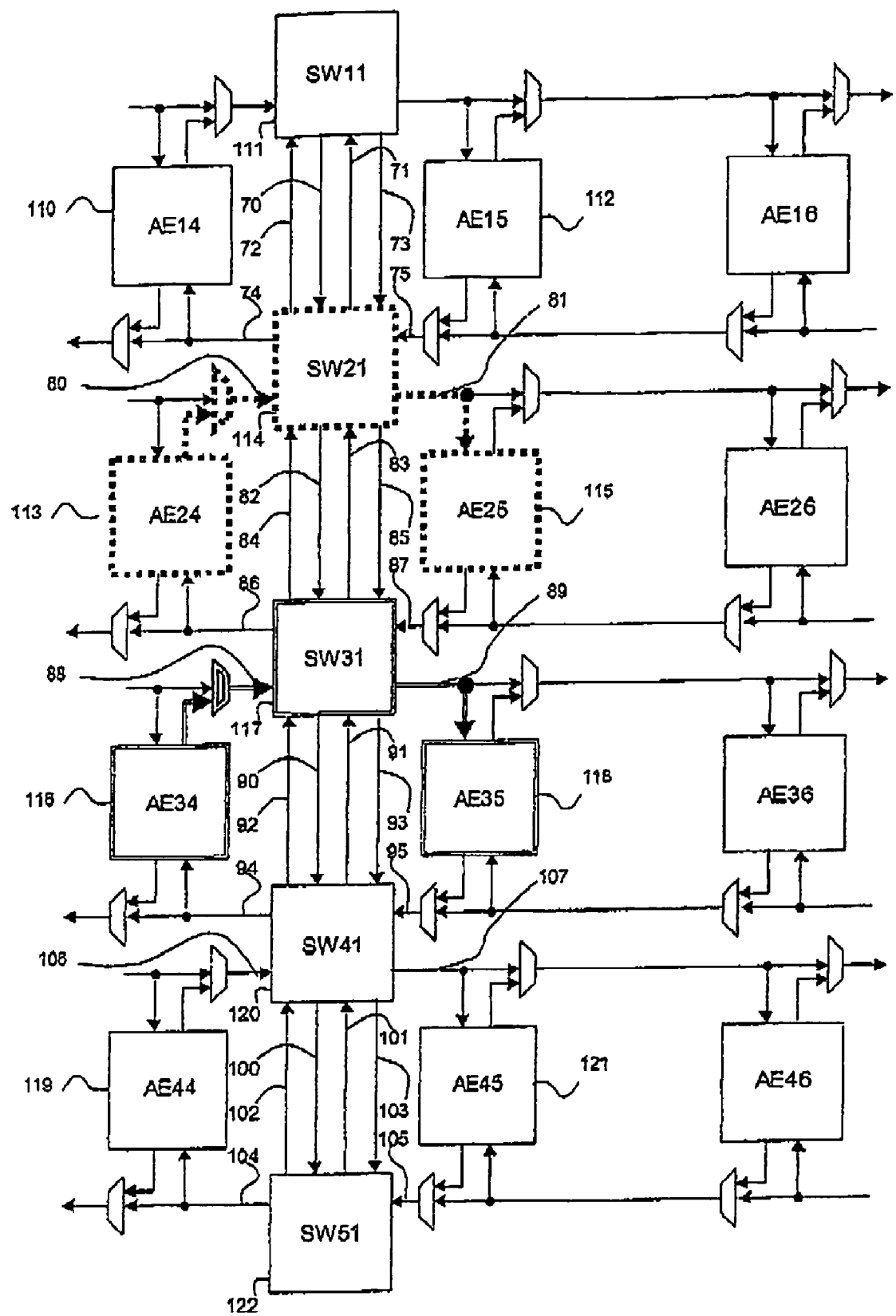

For a horizontal route on the failed row or below it, all routing is moved down one row. This is illustrated in FIG. 7, which shows that a route from AE24 to AE25, via bus segments 80 and 81 and switch SW21, is moved to a route from AE34 to AE35, via bus segments 88 and 89 and switch SW31.

Figure 8:
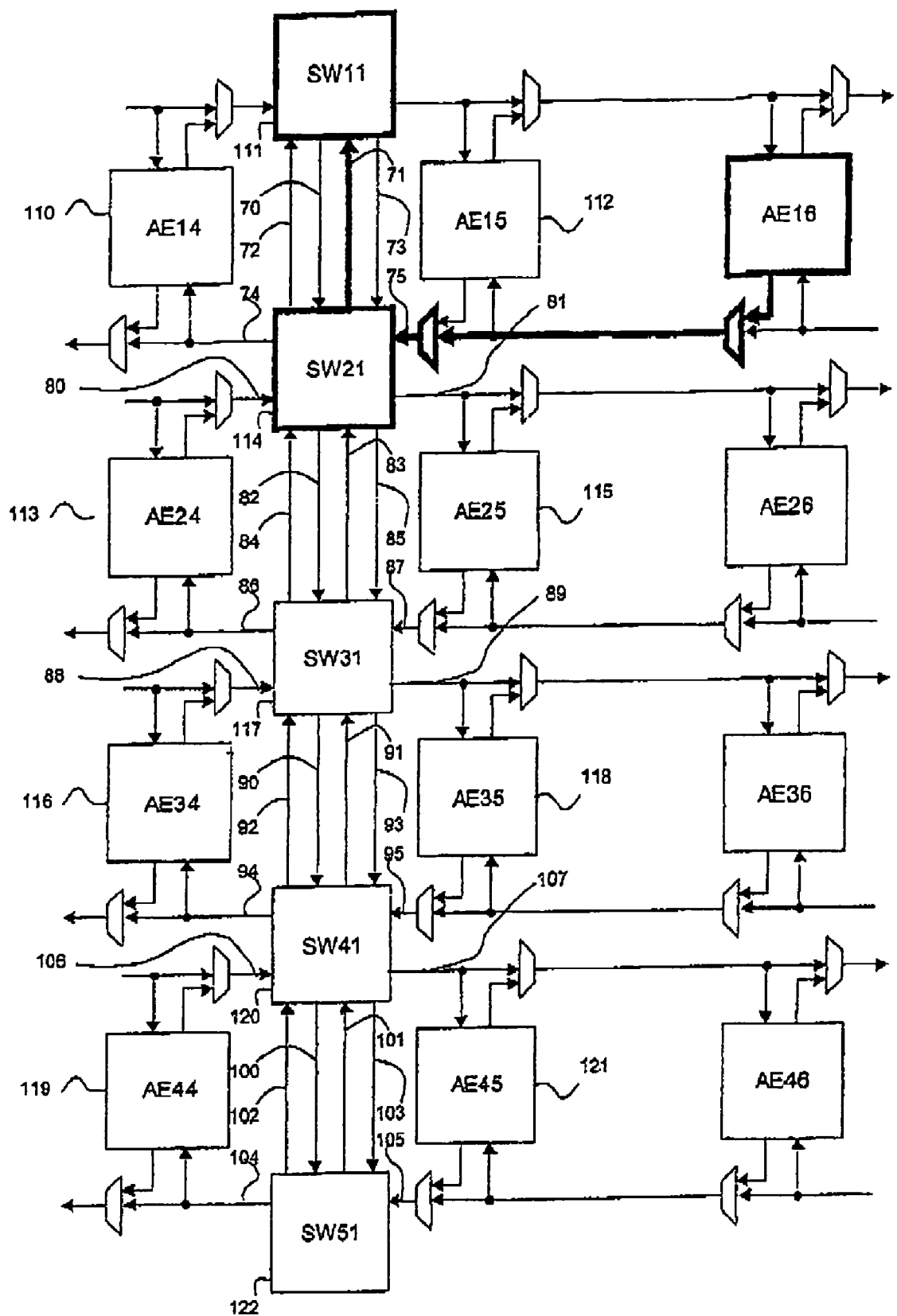

Routes lying entirely above the failed row are unaffected, as illustrated in FIG. 8

Routes lying entirely below the failed row are all moved down by one row, in the same way as horizontal routes, as described above.

Figure 9:
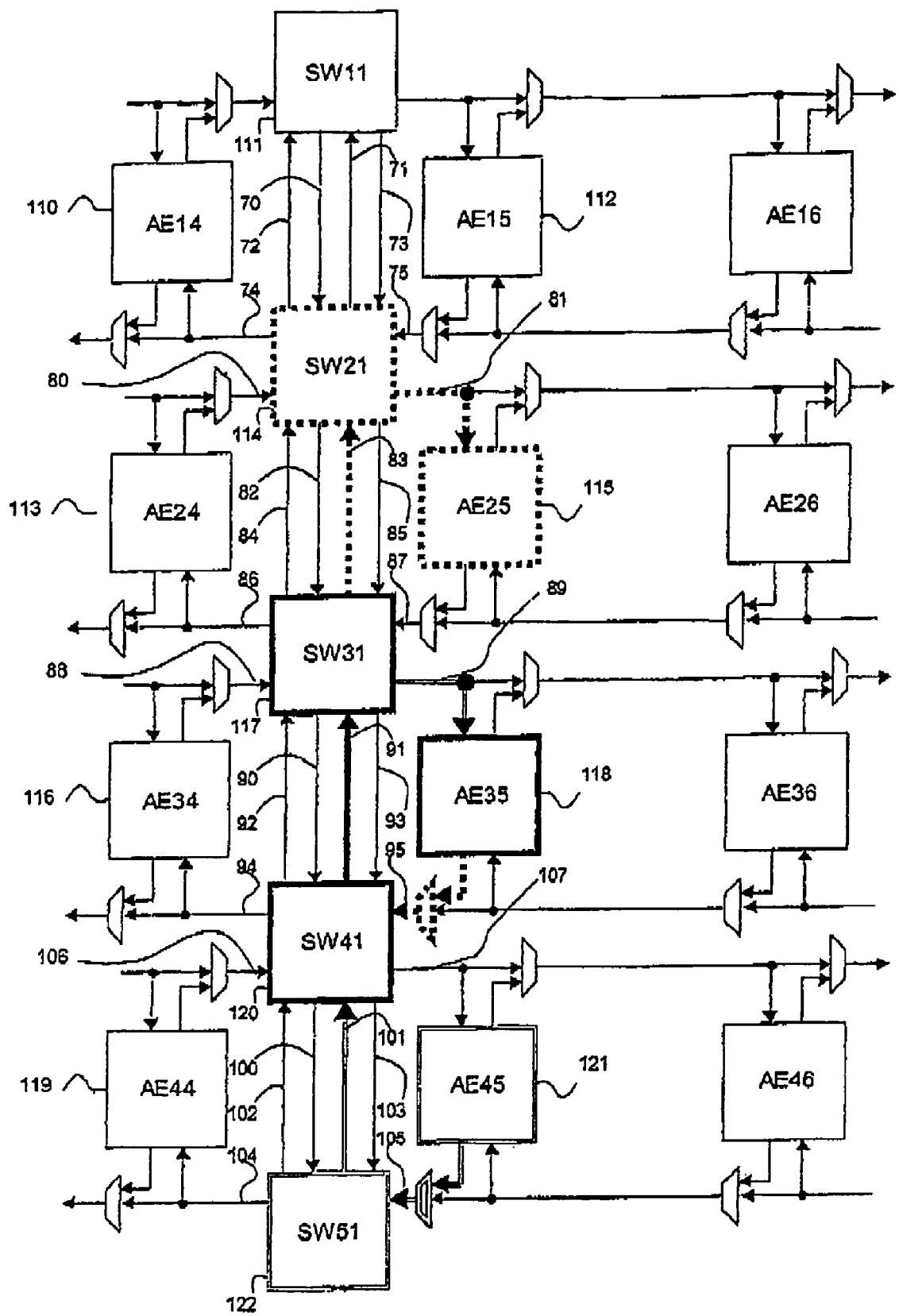

Routes going to the failed row from below are handled in the same way as routes lying entirely below the failed row and this is illustrated in FIG. 9. This shows that a route from AE35 to AE25, via bus segment 95, switch SW41, bus segment 91, switch SW31, bus segment 83, switch SW21, and bus segment 81 is moved to a route from AE45, to AE35, via bus segment 105, switch SW51, bus segment 101, switch SW41, bus segment 91, switch SW31, and bus segment 89.

Figure 10:
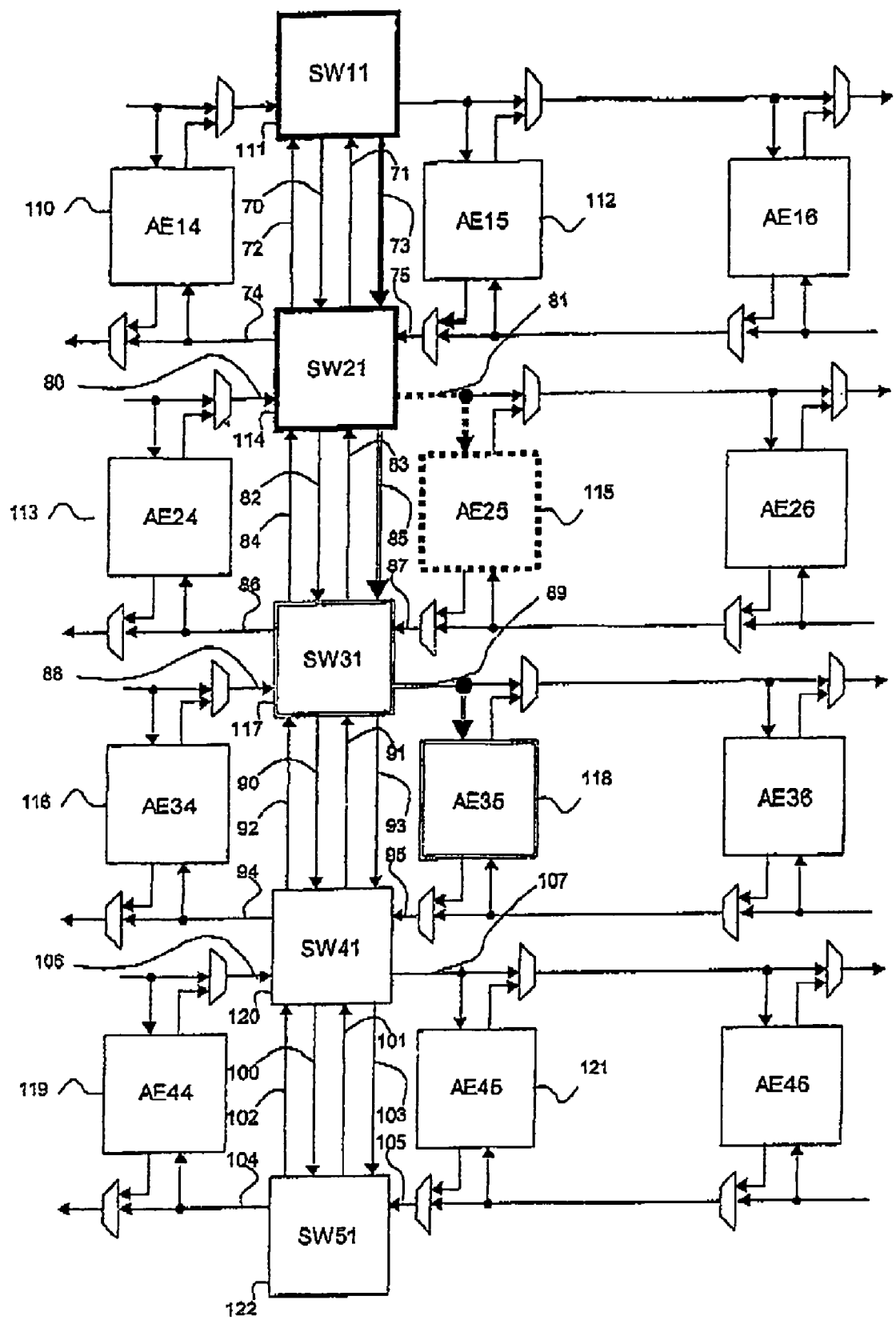

Routes going to the failed row from above, where the original route contains at least one vertical bus segment require that the vertical route must be extended down by one more switch. This is illustrated in FIG. 10. This shows a partial route, from switch SW11, to AE25, via bus segment 73, switch SW21, and bus segment 81, which is extended from switch SW21, to AE35, via bus segment 85, switch SW31, and bus segment 89.

Figure 11:
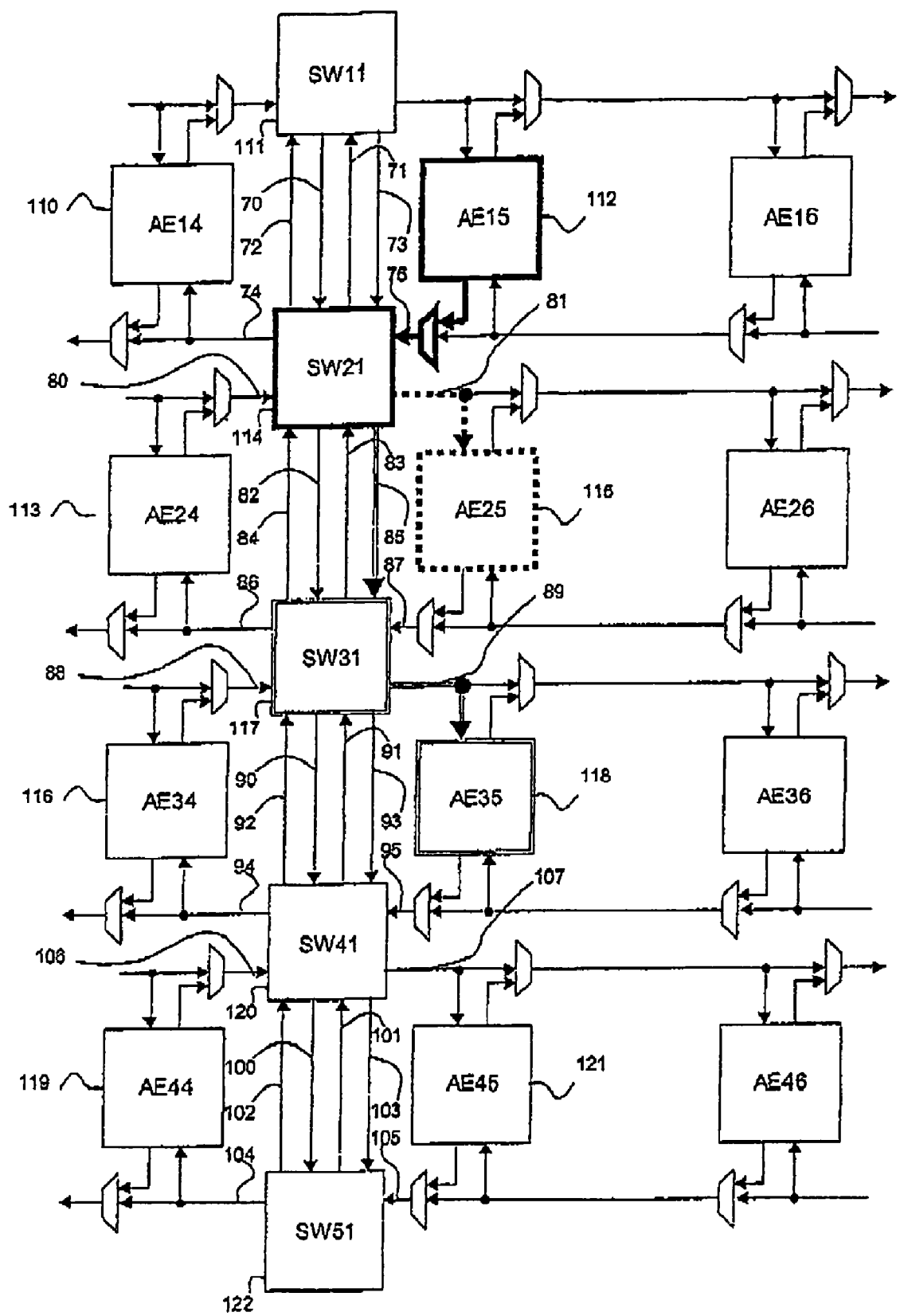

Routes to the failed row from the row above the failed row that do not use any vertical bus segments form a special case. Specifically, as illustrated in FIG. 11, the original route contains no existing vertical bus segments to extend, unlike the example shown in FIG. 10. As a result, a new vertical section must be inserted. This could lead to a potential problem, as the vertical bus segment that is required for the new route may have already been allocated to another route during the required time slot.

Therefore, when allocating routes, this requirement must be taken into account. Specifically, when planning any route that goes from one row to another without using any vertical bus segments, the system should reserve a connection on the bus segment that would be required in the event of a failure in the lower of the two rows.

The unevenly spaced arrangement of vertical buses, described above, in which two pairs of vertical buses are provided after each group of four columns of array elements, allows these connections to be reserved more efficiently compared with an alternative more even spacing in which, say, one pair of vertical buses is provided after each group of two columns of array elements.

In FIG. 11, the route from array element AE15 to array element AE25, via bus segment 75, switch SW21, and bus segment 81, is moved so that bus segment 81 is not used and the route from switch SW21 is extended to array element AE35, via vertical bus segment 85, switch SW31, and bus segment 89. A connection on bus segment 85 (or on the other bus segment 82 that runs from switch SW21 to SW31) must be reserved for that time slot by the original route allocation process.

Figure 12:
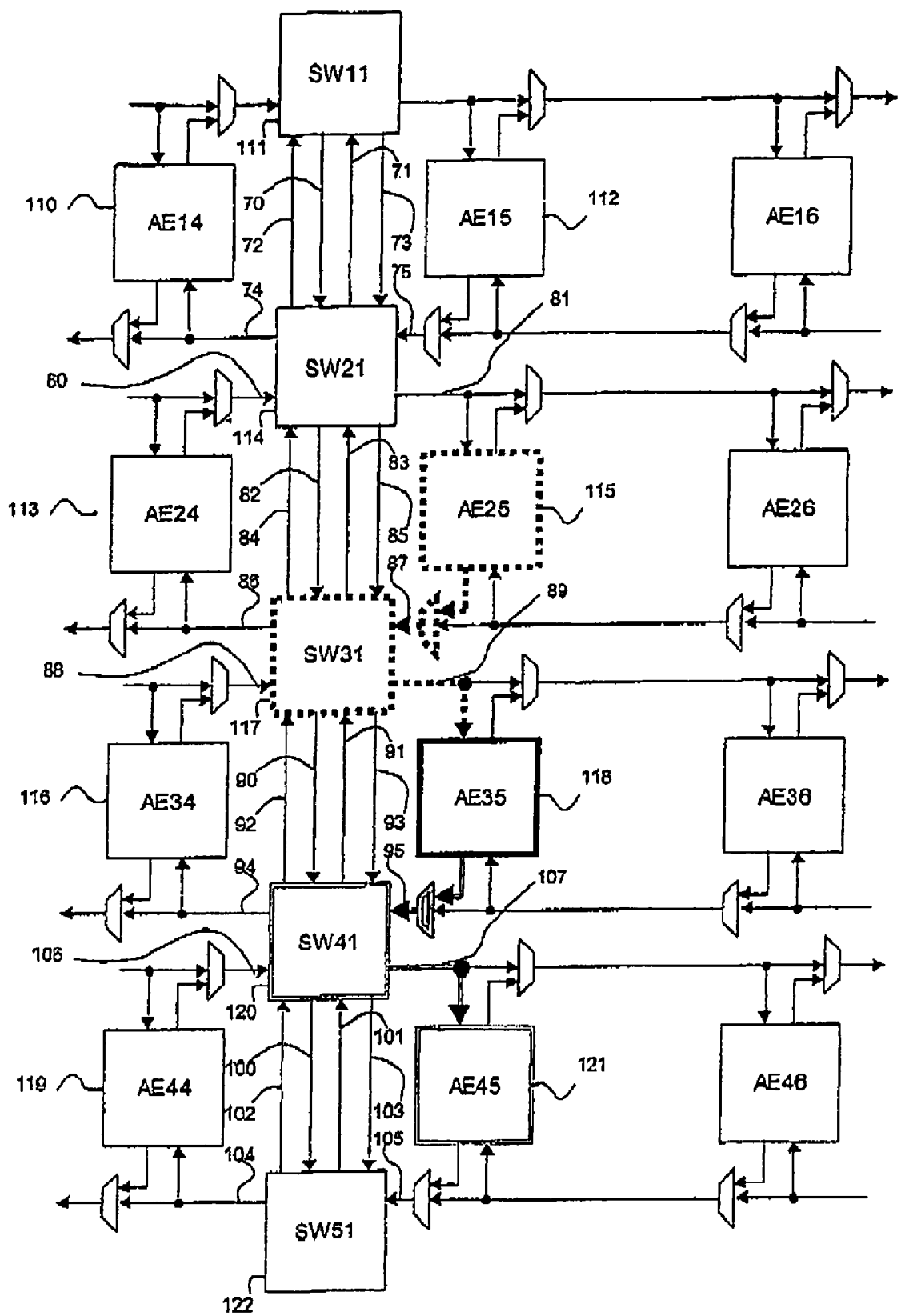

Routes starting from the failed row and going down, as shown in FIG. 12, are handled in the same way as routes lying entirely below the failed row. For example, a route from array element AE25 to AE35, via bus segment 87, switch SW31, and bus segment 89, is moved to a route from array element AE35 to AE45, via bus segment 95, switch SW41, and bus segment 107.

It should be noted that, in this case, although the original route did not include any section of a vertical bus, neither does the replacement route. As a result, this does not lead to the potential problem described above with reference to FIG. 11.

Figure 13:
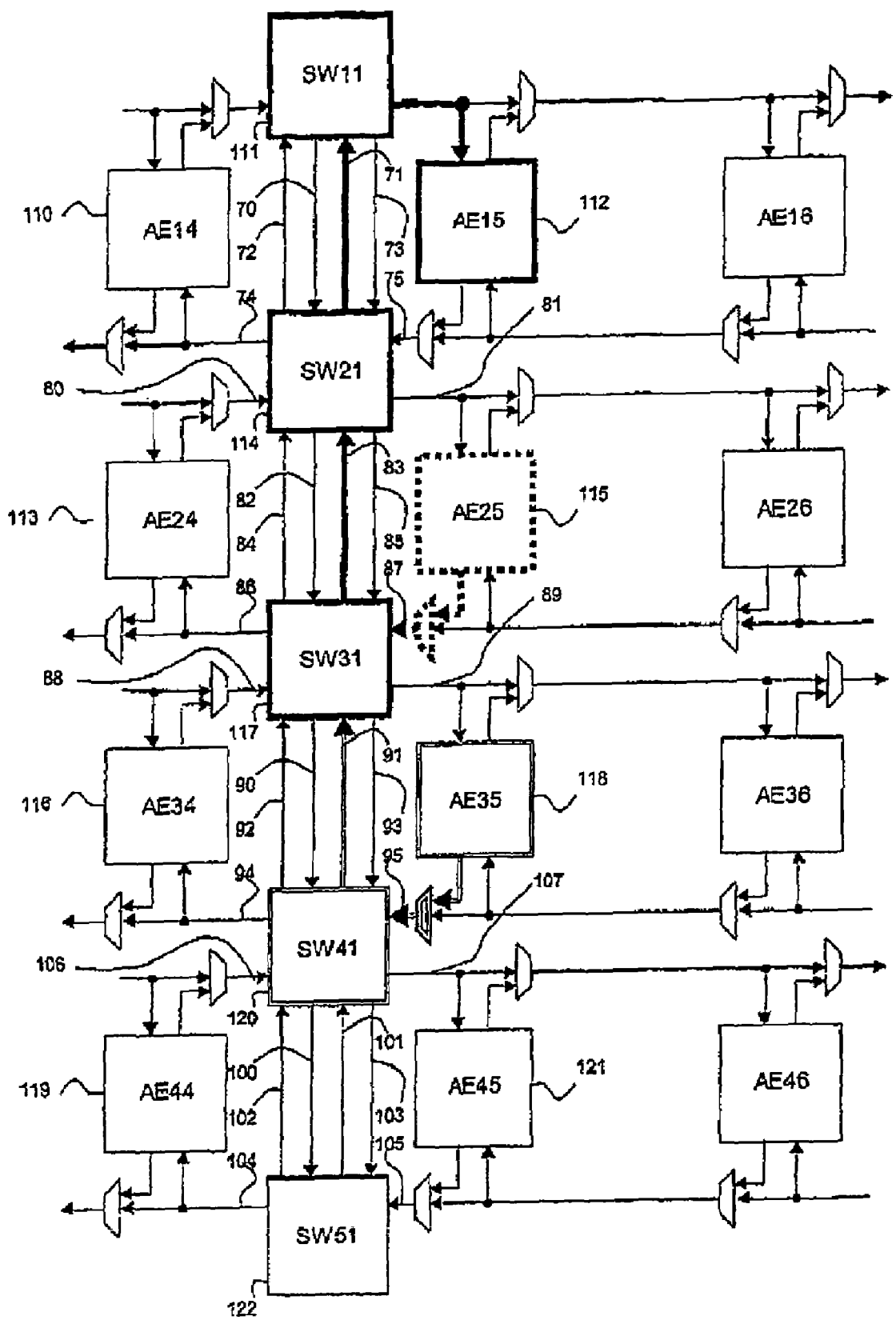

Routes coming from the failed row and going up, where the original route includes at least one vertical bus segment, are extended by one vertical bus segment as illustrated in FIG. 13. Here, a route from array element AE25 to AE15, via bus segment 87, switch SW31, bus segment 83, switch SW21, bus segment 71 and switch SW11, is altered so that it starts at array element AE35, and is routed to SW31 via bus segment 95, switch SE41, and bus segment 91, thereafter continuing as before to AE15.

Figure 14:
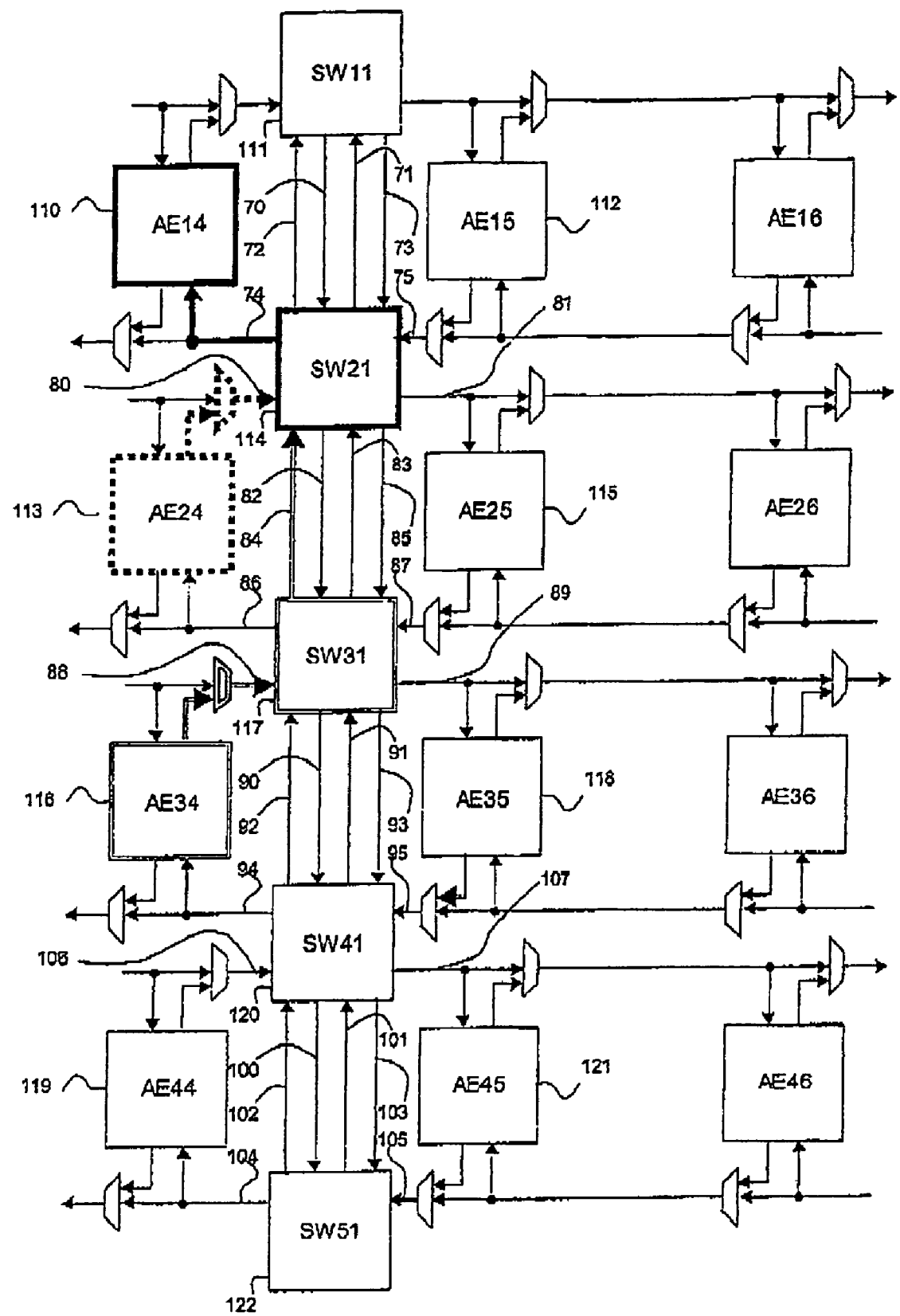

A route from the failed row, to the row above, not using any vertical bus segments, is illustrated in FIG. 14. This is analogous to the case shown in FIG. 11, above. Specifically, a route from array element AE24 to AE14 via bus segment 80, switch SW21 and bus segment 74 is replaced by a route from array element AE34 to AE14 via bus segment 88, switch SW31, bus segment 84, switch SW21 and bus segment 74. Thus, a connection on bus segment 84 (or on the other bus segment 83 that runs from switch SW31 to SW21) must be reserved for that time slot by the original route allocation process, to avoid the possibility of contention.

Figure 15:
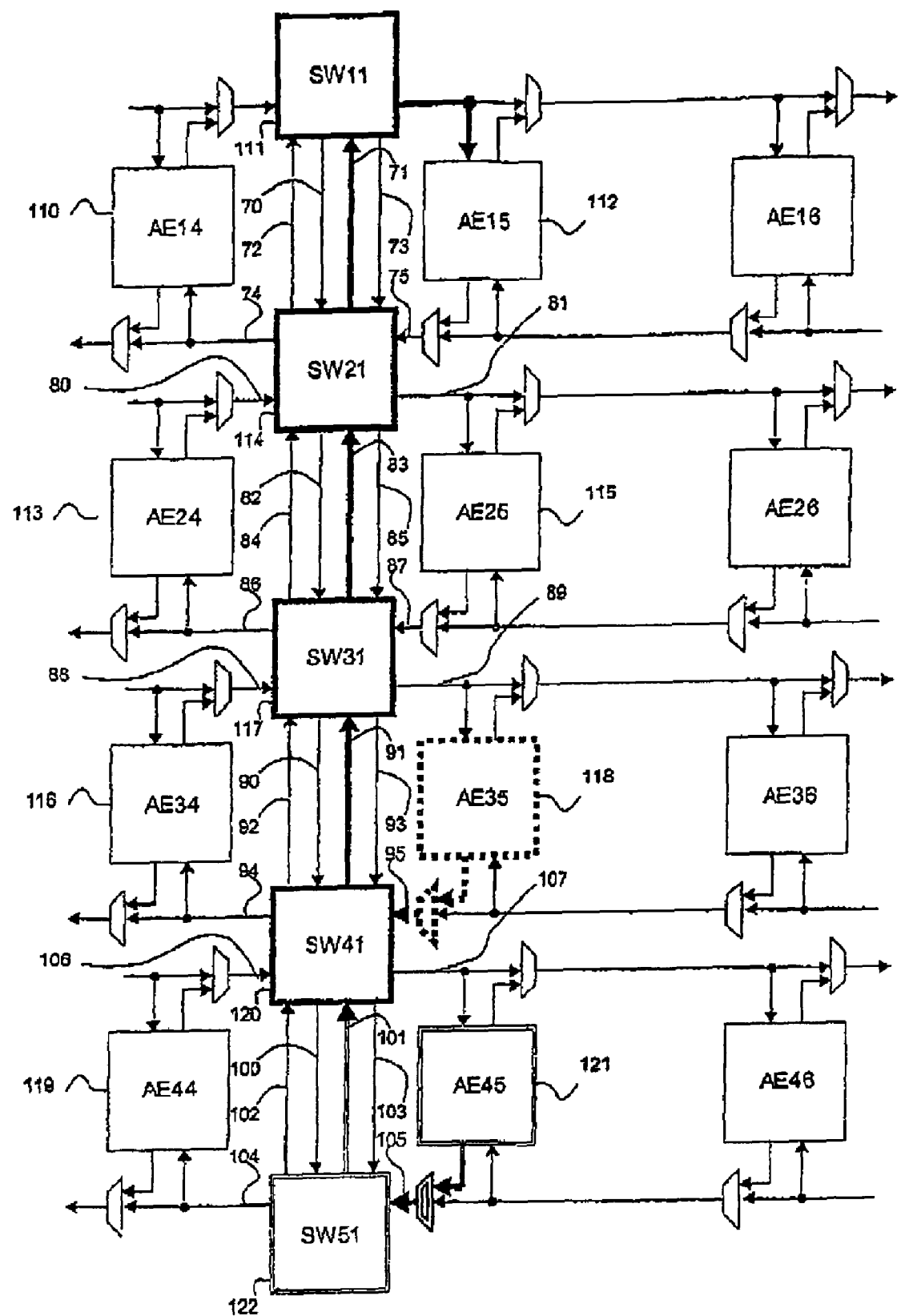
Figure 16:
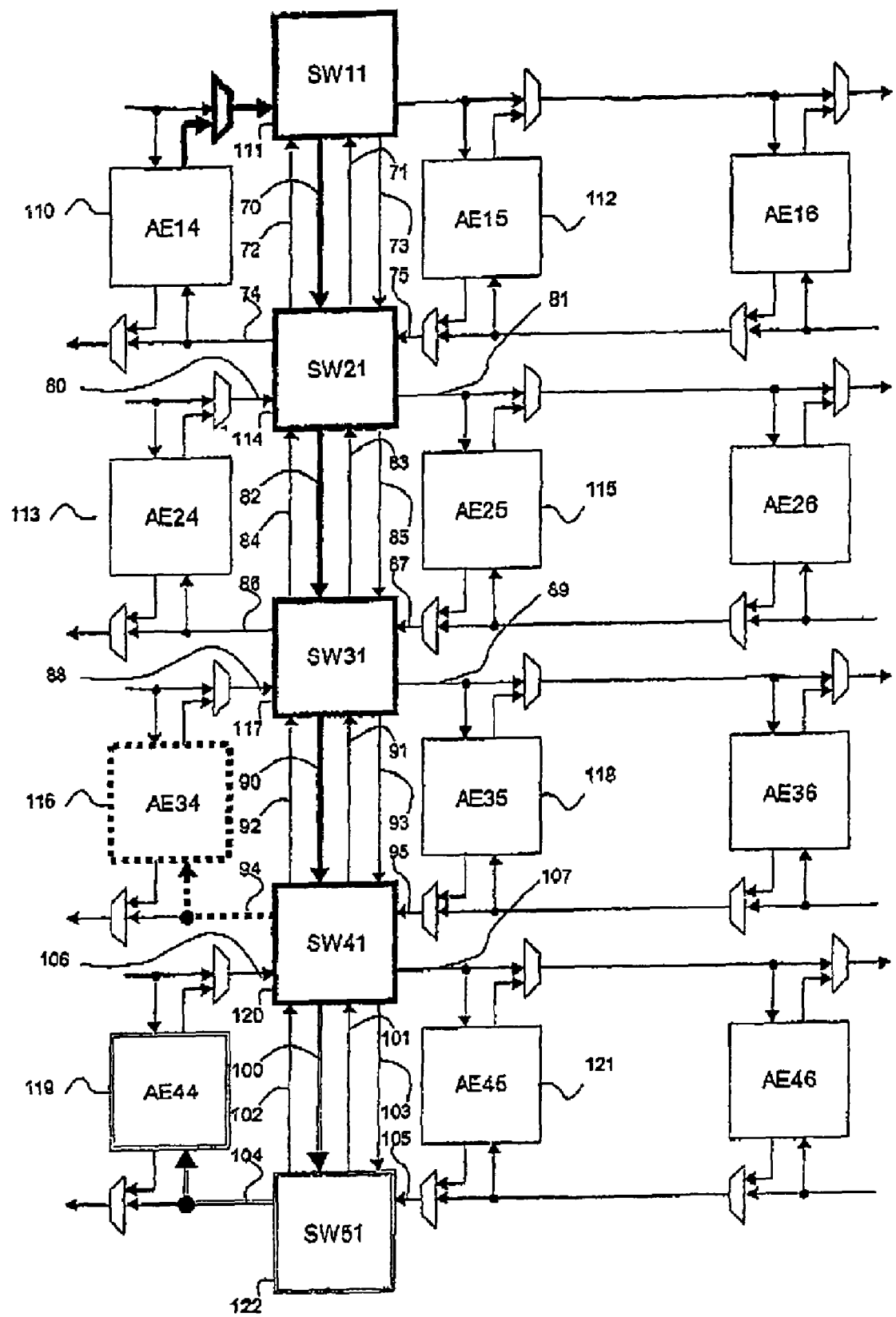

Routes that cross the failed row are shown in FIG. 15 (running upwards) and FIG. 16 (running downwards). In these cases, the allocations of all the vertical bus segments below the failed row are moved down by one row, and an extra bus segment is allocated in the failed row.

The process of determining the required contents of the RAM 61 of each switch, in each of the above cases, will be clear to one skilled in the art.

The above description shows how a single failed row may be replaced by a spare row. If two spare rows are included in the array, then two failed rows can be replaced. The process is exactly the same as that described above, but is repeated twice. First, the highest failed row is replaced, with the fact that there is a second failed row being ignored. Then, the lower failed row is replaced. In principle, any number of failed rows may be repaired in the same way, although a practical restriction on the number of replacements is that, since vertical routes may become longer after each row is replaced (because the routing is effectively "stretched" over the failed row), this increases the transit time for the data. Eventually, the increased transit time would mean that the data could not be processed at the required rate.

If failures are detected as part of production test, the information about which rows contain failures may be used to blow laser fuses on the devices under test. The process that loads programs onto the array elements and manipulates the data in the RAMs of the switches may use this information at the time the array is configured. Alternatively, the method described here may be used to repair failures that occur during operation in the field. In this case, failures in array elements may be detected by running test software on the array elements.

The method and apparatus are described herein primarily with reference to an arrangement in which the processor elements include microprocessors. As noted above, the processor elements may simply be able to store data. Conversely, each processor element may itself contain an array of smaller processor elements.

The invention claimed is:

1. A method of allocating functionality to processor elements in a processor array, wherein the processor array comprises a plurality of processor elements arranged in an array of rows and columns, the processor elements being interconnected by buses running between the rows and columns and by switches located at the intersections of the buses, wherein, in operation of said processor array, data is transferred during time slots between processor elements over horizontal buses running between the rows of processor elements and over vertical buses running between the columns of processor elements, the method comprising:

identifying one row as a redundant row to which no functionality is initially allocated, such that, in the event that a first processor element is found to be faulty, functionality can be removed from the row that contains said first processing element, and can be allocated instead to the redundant row; and when allocating functionality to the processor elements, such that data is scheduled to be transferred during a first time slot from a first processor element in a first row to a second processor element in a second row, which is different from the first row, via one of said switches without using any vertical bus, reserving said time slot for said scheduled data transfer on a segment of a vertical bus that would be used in the event of a reallocation of functionality following a determination that either said first processor element or said second processor element was faulty.

2. A method as claimed in claim 1, further comprising:

in the event that a first processor element is found to be faulty, allocating the functionality, removed from the row that contains said first processing element, to an adjacent row; and reallocating the functionality from the adjacent row, to a further row adjacent thereto, as required until functionality has been allocated to the redundant row.

3. A method as claimed in claim 1, wherein the redundant row is located at an edge of the array.

4. A method as claimed in claim 2, wherein the redundant row is located at an edge of the array.

5. A processor array, comprising:

a plurality of processor elements arranged in an array of rows and columns; buses running between the rows and columns; and switches located at the intersections of the buses, wherein the processor elements are interconnected by the buses and the switches, wherein the processor array is adapted to transfer data during time slots between processor elements over horizontal buses running between the rows of processor elements and over vertical buses running between the columns of processor elements, wherein one row is identified as a redundant row to which no functionality is initially allocated, such that, in the event that a first processor element is found to be faulty, functionality can be removed from the row that contains said first processing element, and can be allocated instead to the redundant row; and wherein, when allocating functionality to the processor elements, such that data is scheduled to be transferred during a first time slot from a first processor element in a first row to a second processor element in a second row, which is different from the first row, via one of said switches without using any vertical bus, the processor array is adapted to reserve said time slot for said scheduled data transfer on a segment of a vertical bus that would be used in the event of a reallocation of functionality following a determination that either said first processor element or said second processor element was faulty.

6. A processor array as claimed in claim 5, wherein the arrangement of processor elements in each row is the same as the arrangements of processor elements in each other row, wherein said horizontal buses comprise pairs of horizontal buses running between the rows of processor elements, each pair comprising a first horizontal bus carrying data in a first direction and a second horizontal bus carrying data in a second direction opposite to the first direction, wherein some pairs of adjacent columns of processor elements have no vertical buses running therebetween, and other pairs of adjacent columns have two buses carrying data in a first direction and two buses carrying data in a second direction opposite to the first direction running therebetween, and wherein said switches are located at the intersections of the horizontal and vertical buses.

7. A processor array as claimed in claim 6, wherein each switch comprises:
   a plurality of input buses and a plurality of output buses;
   a memory device, which stores information at each address thereof, indicating what data is to be switched onto each of the output buses; and
   a controller, for counting through addresses of the memory device in a predetermined sequence.

8. A processor array as claimed in claim 7, wherein the memory device stores information which indicates whether the data to be switched onto each of the output buses is:
   the data value on one of the input buses;
   the previous data value on said output bus; or
   the value zero.

* * * * *